United States Patent Office 3,600,309
Patented Aug. 17, 1971

3,600,309
SOLID LUBRICANT FOR REDUCING DIE-PLATING AND DIE-DRAG DURING THE EXTRUSION OF VISCOUS RUBBER AND ELASTOMERIC PLASTIC COMPOSITIONS
Thomas N. Loser, Yardley, Pa., and Thomas Jones, Piscataway, N.J., asssignors to Wyrough & Loser, Inc., Trenton, N.J.
No Drawing. Filed Jan. 12, 1968, Ser. No. 697,308
Int. Cl. C10m 7/28
U.S. Cl. 252—12                  15 Claims

ABSTRACT OF THE DISCLOSURE

A new lubricating method and a new solid lubricant composition for reducing die-plating or die-buildup and die-drag during the extrusion of viscous rubber and elastomeric plastic compositions in the form of a green stock which usually contains reinforcing agents, fillers, pigments, etc., the active lubricant ingredient being finely divided polytetrafluorethylene granular powder having an average particle size of at least 0.5 micron, preferably 1 to 8 microns, and being effective in an amount of 0.05 to 0.45 part per 100 parts of rubber or plastic elastomer. Especially benefitted are "draggy" extrusion compositions based upon butyl rubber, cross-linked polyethylene, natural rubber, butadiene-acrylonitrile rubber, chlorosulfonated polyethylene rubber (Hypalon), neoprene, ethylene propylene rubbers, styrene-butadiene rubbers, acrylonitrile-butadiene-styrene rubbers, polybutadiene, polyisoprene, epichlorohydrin (Hydrin) rubbers, flexibilized polyvinychloride, and ethylene vinyl acetate copolymers.

---

The present invention relates to a new lubricating method and a new solid lubricant composition embodying critical amounts of finely divided polytetrafluorethylene granular powder added to a viscous and shear-resistant rubber or plastic elastomer blended with curing agents and/or reinforcing ingredients, and/or fillers and the like, which mixture is processed in an extruding device for the purposes, in part or in whole, of interim or ultimate shaping.

The critical characteristic of the lubricant, which is hereinafter identified by its common name in commerce, e.g., Teflon, is that it has a critical particle size of at least 0.5 micron, preferably 1 to 8 microns, and is added in a critical proportion at a level of 0.05 to 0.45 part per 100 parts of rubber or plastic elastomer which is the basis of the raw stock for extruding. This maximum amount of 0.45 part is so small that no detectable difference has been found in the usually measured properties, e.g. physical properties, chemical properties, electrical properties, etc., of the vulcanized rubber or plastic elastomer, and yet amounts of 0.05 to 0.45 part per 100 parts of rubber or plastic are remarkably effective to significantly increase the rate of extrusion, and to significantly reduce excessive wear of the die.

Further, superior surface finish and appearance as well as superior critical dimensioning in very limited tolerances of thick or thin sections are achieved with the lubrication system of the present invention, as it has been applied to even the most difficult or "draggy" of the rubbers or elastomers. These elastomers comprise natural rubber and synthetic rubbers, including but not being confined to butyl rubber, cross-linked polyethylene, natural rubber, butadiene-acrylonitrile rubber, chlorosulfonated polyethylene rubber (Hypalon), neoprene, ethylene propylene rubbers, styrene-butadiene rubbers, acrylonitrile-butadiene-styrene rubbers, polybutadiene, polyisoprene and epichlorohydrin (Hydrin) rubbers, flexibilized polyvinylchloride, and ethylene vinyl acetate copolymers.

One of the principal advantages of the invention is the simplicity with which the critical small amounts of the lubricant may be added to "draggy" rubber or to the plastic mixture. A simple method of addition is to preweigh the powder in the amount of about 2 ounces per 100 pounds of rubber batch (often a batch of about 300–500 pounds) in a "convenience" plastic bag which can be made of compatible or miscible material such as low melting film-grade polyethylene. The thin film of the bag will melt at or below the mixing temperature of most elastomer batches and the infinitely small amount added of 1–2 mil thickness can be combined with no side effects. The bag may be simply thrown into the mix or, if desired, it may be opened and its precisely preweighed contents dumped directly into the mixture. Because the lubricant is a costly additive, there is the cost factor as an added reason for this precise addition, but the lubricant works best at the 2 ounce level. It is preferable, and will not produce undesirable side effects, to insert the lubricant additive into the mix as early as possible to insure maximum dispersion.

The powder addition, where it is desirable to discharge the contents of the preweighed bag, is preferred where the addition will be made to mixes which consist largely of powders or pellets, for example, as in most plastics, where the mixing is carried out in a ribbon blender or high intensity powder blender, such as in a Henschel mixer.

However, dispersion of the lubricant in non-powder mixtures can be aided if the Teflon powder is dispersed in a solid dispersing medium which also has no effect upon the characteristics of the extruded product due to the minute amount of solid dispersing medium employed and to its relative inertness.

The present invention also relates to a solid lubricant composition in block form consisting essentially of a minor proportion of storage-stable thermoplastic solid synthetic rubber binder of which polyisobutylene and ethylenepropylene rubbers are preferred examples. The said solid binder preferentially has (but is not confined to) a base durometer expressed as a Shore A Hardness value lying between 25 and 45 and a Mooney viscosity value between 35 and 60, together with a major proportion of finely divided polytetrafluorethylene granular powder uniformly dispersed in said solid binder, said powder having an average particle size of at least 0.5 micron, preferably 1 to 8 microns, which is intimately dispersed in said solid binder. Preferably, the proportion of polytetrafluorethylene is 70–85% of the total.

This invention also relates to a novel, simple method for preparing the solid lubricant in slab or block form by dispersing it in conventional rubber or plastic two-roll mills or internal mixers of high-shear design, such as a Banbury, or a continuous mixer of the screw type, to produce a storage-stable, solid product uniquely adapted to lubricate flexible green elastomer compositions in the extrusion machine.

It can be prepared into even more convenient forms thereafter by forming into wafers, granules, strips, slabs or the like, which may be predetermined precise weights.

In any of the above forms, the active Teflon portion of the solid product of the invention is effective to lubricate the composition to reduce the condition known as die-plating or die-buildup or die-drag at the interior surface of the hard metal (usually steel) extruding die. The minor binder portion of the solid form, preferably 15–30% of the total, in no way interferes with this performance.

It is well known that die-plating and die-buildup cut down the rate and efficiency of extrusion and impair the quality of the extruded rubber or flexible plastic elastomer. Die-plating causes a rough, flaky or grooved surface to appear on the extruded product. A buildup of rubbery chemicals, which adheres irregularly and progressively to these die surfaces, is noted on the interior of the die. In severe cases of die-buildup, separation of rubber chemicals from rubber occurs at the die orifice and a laminated surface forms which necessitates discarding the extruded product. The wall thickness cannot be precisely controlled within the desired limits when die-buildup is severe. Hollow extruded forms are not concentric at inner and outer surfaces in the manufacture of articles such as rubber hose, insulated wire and conduit.

The die-plating deposit is not uniform in thickness on the die-surface which further restricts the uniform flow of the mixed green rubber compound through all areas of the die orifice, resulting in varying wall thickness of the tube. This defect is commonly known as "out of center" and is the cause of immediate rejection of the extruded product. An additional consequence of varying wall thickness in insulated wire and cable extrusions can also be excessive electrical faults of the undersize wall thickness to withstand designated electrical stress.

The usual rubber reinforcing, lubricating and vulcanizing ingredients in the green stock mixture are subjected to extreme pressure at the extrusion die. Due to the very high frictional forces created by this pressure, there develops extremely high temperature at the die. Extruder head pressures vary from about 100 p.s.i. up to 5,000 p.s.i. or more and the temperatures which are observed during rapid extrusion build up from 90° F. minimum to as much as 260° F. In certain extrusion operations, such as the continuous vulcanization process, the die face is exposed to temperatures of about 375° F. to 425° F. This very high temperature at the die face can cause premature vulcanization of the uncured compound as well as die-buildup or die-plating. It is at the die face end of the die orifice, as well as along the land or bearing of the die, where die-buildup or die-plating occurs.

The extrusion of solid pieces, such as tire treads and one-piece tread-sidewall stocks, exhibits the same problem but here it is most pronounced at the edges of such stocks. These are "feather" or "knife" profiles in which it is important to maintain very close tolerances. Die-buildup or die-plating causes a change in the profile dimensions as the outer edges of the die are highly susceptible to buildup and any such resistance in this area will cause tearing of the edges of the extrudate which calls for its immediate rejection. A common rate of rejection would be 15–25%.

"Camelback" is the industry name for tire retread. Camelback is commonly produced in an adjustable tread die which is especially susceptible to edge tearing caused in large part by die-buildup. This is a serious problem for it is critical to maintain a very fine edge which will leave a nearly invisible parting line at the tread-sidewall interface.

Edge-tearing, as described above, which is traceable to die-plating or die-drag, can be reduced by the use of otherwise unnecessary and increased amounts of conventional lubricants, such as fatty acids and stearates, which serve to lubricate the die but these lubricants introduce intolerable side effects exhibited as a decline in physical properties and, in the case of acidic additives, such as stearic acid, sometimes reduce the rate of cure. The product of our invention, due both to its chemical inertness and to the extremely low, critical concentration required, reduces edge-tearing substantially but does not alter the rate of cure nor measurably affect physical properties of such extrudates.

The reasons for the deposit of compounding chemicals on the surface of the extruder-forming dies are not exactly known. It is though by some authorities that part of the fillers, such as clay, which at times is not completely dispersed in a polymer matrix, may be forced out of the matrix at the point of highest extrusion pressure which is a point along the extruder die area. It is also thought that a compound which has poor flow characteristics may develop premature scorch at the die area and a resultant deposit of the compound occurs. One analysis of a deposit obtained after a green butyl rubber compound had been extruded indicated that the deposit contained clay which was forced away from the butyl polymer so that a clay-rubber ratio was deposited which was considerably different than the basic green compound. This clay appears at the surface of the product in a much higher ratio and impairs the quality of the product.

Chemical oil softeners and strong ester plasticizers are effectively avoided by using critically small amounts of the present lubrication system in rubber or plastics and provide low internal friction during mixing and extrusion in a new manner to obviate premature scorch or cure. Many of the chemical softeners attack the steel die and form a film on the die.

Solid lubricants for addition to the molding composition, such as graphite, mica or molybdenum disulfide, are unsatisfactory as additions to green stock in extruding machines because they are ineffective, expensive, and introduce undesirable physical or electrical properties in the vulcanized stock which adversely affect the quality of the extruded product. For example, Remer U.S. Pat. No. 3,060,853 shows that molybdenum disulfide makes rubber electrically conductive which rules out this lubricant for use in extruding elastomeric polyethylene or elastomeric vinyl chloride rubber wire insulation.

In contrast, the inert binder of the invention, such as polyisobutylene or ethylene propylene rubber, is almost totally non-conductive, essentially non-hygroscopic and does not affect electrical insulating properties, while the Teflon is completely effective as a lubricant.

Mica is unsatisfactory because it is somewhat hygroscopic, erodes the steel die, and imparts undesirable surface scum to the extruded rubber product. These defects are not found when the present novel product is used.

It is surprising that Teflon is effective to lubricate sticky green stock since, in the prior art, polytetrafluorethylene granular powder has required special heat treatment to be useful. Special molding methods comprise preforming, sintering and sheet shaping to produce 10 to 125 mil thick anti-friction insulation for electrical equipment (see Thomas et al. U.S. Pat. No. 2,936,630) but the granular polytetrafluorethylene must be free from organic additives of any kind and is purified by treatment with an oxidizing agent.

Sub-micron size Teflon latex emulsion polymer powder is unsuitable in molding and is unsuitable in the present invention because it bears a coating of surface-active chemicals or wetting agents. This latter sub-micron type of emulsion polymer must itself be lubricated when extruded, as taught in Lontz U.S. Pat. No. 2,644,802 which points out that polyorganosiloxanes as lubricants in an amount of 25 parts per 75 parts of tetrafluorethylene polymer must be added.

The addition of this emulsion type sub-micron polytetrafluorethylene powder to a rubber compounding mixer or extruder is also unsatisfactory because the significant moisture content, even in amounts as little as 0.1%, creates serious problems in vulcanization and maintenance of high quality control of the extruded rubber product.

Volatile liquid lubricating and dispersing agents for polytetrafluorethylene powder, such as white oil No. 30 lubricant, as recommended by Field in U.S. Pat. No. 3,060,517, are unsatisfactory as additions to the rubber composition because the extruded rubber product is swelled and then shrinks and, further, because the compounder cannot take the time to boil off the liquid after mixing in the lubricant. Xylene dispersant, used in Panagrossi et al. U.S. Pat. No. 2,945,773, is also unsuitable for the same reasons.

Experiments have also been conducted with forming dies which have been coated with various chemicals. Polytetrafluorethylene coated steel dies have been used for wire and cable extrusions in an attempt to overcome die-plating or die-buildup. However, the experiments were not successful since the Teflon coating wore, within less than an hour of running time, from the extruder forming die because of extrusion heat and pressure.

It is therefore surprising to find that the addition of the solid film binder dispersion to the molding composition in amounts of 0.05 to 0.45 part per hundred significantly reduces die-plating and yet introduces no undesirable side effects to the finished extrudate.

Having described the invention generally, the following examples are given to illustrate specific embodiments.

Examples:
(1) Butyl rubber wire and cable insulating compound.
(2) Butadiene-acrylonitrile rubber hose compound.
(3) Ethylene-propylene diene rubber wire and cable compound.
(4) Passenger tire tread-sidewall.
(5) Cross-linked polyethylene extruded pipe compound.

EXAMPLE NO. 1

This example represents the most drag encountered in a wire compound.

Butyl rubber wire and cable insulating compound

Formula

| | Parts |
|---|---|
| Butyl rubber 035 | 100.00 |
| Polytetrafluorethylene powder or solid binder dispersion of polytetrafluorethylene powder | 0.05–0.45 |
| Zinc oxide | 7.50 |
| Paraffin wax | 12.50 |
| Red lead | 7.50 |
| Stearic acid | 1.25 |
| Fine thermal black | 10.00 |
| Anhydrous aluminum silicate | 109.25 |
| Benzothioazole disulfide | 3.75 |
| p-Quinone dioxime | 1.25 |

The polytetrafluorethylene may be used interchangeably in the powder form or in dispersed form in a solid binder selected from the groups consisting of polyisobutylene and ethylene-propylene copolymer.

The amount of active ingredient, e.g., polytetrafluorethylene is preferably 2 ounces per 100 pounds rubber in the formula, but the same limits as in the above table are present in the solid binder form as in the powder form.

After complete mixing of the compound, which may be carried out with equal success in either internal or open mixing equipment, the compound is subsequently processed in an extrusion machine. The mixed uncured compound can be either hot fed (warmed by open milling immediately before extrusion) or cold fed (no prior warming) into an extruder. A typical extruded wire is 5 kv. 4/0 AWG copper or aluminum conductor, semiconducting tape and .156" wall thickness of butyl rubber insulation.

A typical size extruder and some processing details are as follows:

| | |
|---|---|
| Extrusion die | 6". |
| Extruder size | 12:1. |
| L/D | .880" I.D. with 1.00" bearing. |

The extruding machine is equipped with both heating and cooling elements so that the compound can be processed satisfactorily without producing scorch (premature vulcanization).

All drag is eliminated at the die.

EXAMPLE NO. 2

Gasoline-resistant hose compound butadiene-acrylonitrile rubber

Formula

| | Parts |
|---|---|
| Butadiene-acrylonitrile rubber | 100.00 |
| Polytetrafluorethylene powder or solid binder dispersion of polytetrafluorethylene powder | 0.04–0.45 |
| Antioxidant | 1.00 |
| Stearic acid | 1.00 |
| Zinc oxide | 3.00 |
| Sulfur | 1.50 |
| Anhydrous aluminum silicate | 90.00 |
| Titanium dioxide | 10.00 |
| Di-n-octyl decyl phthalate | 15.00 |
| Paraffin wax | 3.00 |
| 2-benzo-thiazolyl disulfide | 1.00 |
| Tetramethyl thiuram monosulfide | 0.25 |
| Diphenyl guanidine | 0.25 |

The poly tetrafluorethylene may be used interchangeably in the powder form or in dispersed form in a solid binder selected from the groups consisting of polyisobutylene and ethylene-propylene copolymer.

The amount of active ingredients, e.g., polytetrafluorethylene is preferably 2 ounces per 100 pounds rubber in the formula, but the same limits as in the above table are present in the solid binder form as in the powder form.

After complete mixing of the compound in either internal or open mixing equipment, the compound is subsequently processed in an extrusion machine. The mixed uncured compound can be either hot fed (warmed by open milling immediately before extrusion) or cold fed (no prior warming) into an extruder.

A typical size hose is 1.00" I.D. with a .125" wall thickness. A typical size extruder and some processing details are as follows:

| | |
|---|---|
| Extruder size | 6". |
| L/D | 10:1. |
| Extrusion die | 1.250" I.D. with 1.00" bearing. |

The extruding machine is equipped with both heating and cooling elements so that the compound can be processed satisfactorily without producing scorch.

All drag is eliminated at the die.

The presence of the die anti-drag lubricant is also beneficial to hose compounds which are cured in lead presses as the stripping of the lead subsequent to curing of the rubber is found to be easier to accomplish. These benefits are also found, to varying but measurable degree, with various synthetic rubbers, such as Hypalon and neoprene, as well as with natural rubber.

EXAMPLE NO. 3

Wire and cable insulation EPDM

Formula

| | Parts |
|---|---|
| EPDM rubber (ethylene propylene diene terpolymer) | 100.00 |
| Polytetrafluorethylene powder or solid binder dispersion of polytetrafluorethylene powder | 0.05–0.45 |
| Red lead | 5.00 |
| Agerite Resin D (polymerized trimethyl dihydroquinoline) | 0.50 |
| Zinc oxide | 5.00 |
| FEF Black | 10.00 |
| Paraffinic oil | 10.00 |
| Sulfur | 0.3 |
| Treated aluminum silicate | 110.00 |
| Dicumyl peroxide | 2.80 |

The polytetrafluorethylene may be used interchangeably in the powder form or in dispersed form in a solid binder selected from the groups consisting of polyisobutylene and ethylene-propylene copolymer.

The amount of active ingredient, e.g., polytetrafluorethylene is preferably 2 ounces per 100 pounds rubber in the formula, but the same limits as in the above table are present in the solid binder form as in the powder form.

After complete mixing of the compound in either internal or open mixing equipment, the compound is subsequently processed in an extrusion machine. The mixed uncured compound can be either hot fed (warmed by open milling immediately before extrusion) or cold fed (no prior warming) into an extruder. A typical extruded wire is 5 kv. 4/0 AWG copper or aluminum conductor, semi-conducting tape and .156" wall thickness of EPDM rubber insulation.

A typical size extruder and some processing details are as follows:

Extruder size _____ 6".
L/D _____ 12:1.
Extrusion die _____ .880" I.D. with 1.00" bearing.

The extruding machine is equipped with both heating and cooling elements so that the compound can be processed satisfactorily without producing scorch (premature vulcanization).

All drag is eliminated at the die.

EPDM rubbers can also be used for jacketing purposes in wire and cable constructions. There is a similar benefit in this application by the addition of polytetrafluorethylene powder (or NO-DIE-DRAG). Other rubbers similarly benefited and which can be used for jacketing purposes are natural rubber, butadiene-acrylonitrile rubber, chlorosulfonated polyethylene rubber (Hypalon), neoprene, butadiene-styrene rubbers, acrylonitrile-butadiene styrene rubbers and Hydrin rubbers.

EXAMPLE NO. 4

Passenger tire tread-sidewall

Formula

| | Parts |
|---|---|
| Oil-extended, black masterbatch SBR (SBR–1824) | 171.0 |
| Polybutadiene rubber | 30.0 |
| Polytetrafluorethylene powder or solid binder dispersion of polytetrafluorethylene powder | 0.05–0.45 |
| HAF black | 25.0 |
| Zinc oxide | 5.0 |
| Stearic acid | 1.0 |
| Paraffin wax | 2.0 |
| Antioxidant (Stabilite) | 1.0 |
| Antiozonant (UOP–288) | 1.0 |
| Light process oil | 2.0 |
| Accelerator (Santocure MOR) | 1.0 |
| Sulfur | 2.0 |

The polytetrafluorethylene may be used interchangeably in the powder form or in dispersed form in a solid binder selected from the groups consisting of polyisobutylene and ethylene-propylene copolymer.

The amount of active ingredient, e.g., polytetrafluorethylene is preferably 2 ounces per 100 pounds rubber in the formula, but the same limits as in the above table are present in the solid binder form as in the powder form.

After complete mixing of the compound (generally carried out in two stages) in either internal or open mixing equipment, the compound is subsequently processed in an extrusion machine, having first come to rest and then been warmed up and cut into a continuous strip 6–8 inches wide by ¾ inch thick. This strip may be fed into an 8 inch extruder at the rate of 50–60 pounds or more per minute.

All drag is eliminated at the die.

When polyisoprene is substituted for a portion of the rubbers cited in the example and suitable curing agents adjustments are made the same benefits are found in the extrusion process when the tiny critical addition of our lubricant is made.

EXAMPLE NO. 5

Cross-linked polyethylene extruded pipe compound

Formula

| | Parts |
|---|---|
| Low density polyethylene | 100 |
| Polytetrafluorethylene powder or solid binder dispersion of polytetrafluorethylene powder | 0.04–0.45 |
| MT Black | 60.0 |
| Agerite Resin D (polymerized trimethyl dihydroquinoline) | 0.5 |
| DiCup T (dicumyl peroxide) | 2.0 |

The polytetrafluorethylene may be used interchangeably in the powder form or in dispersed form in a solid binder selected from the groups consisting of polyisobutylene and ethylene-propylene copolymer.

The amount of active ingredient, e.g., polytetrafluorethylene is preferably 2 ounces per 100 pounds rubber in the formula, but the same limits as in the above table are present in the soild binder form as in the powder form.

A diced or cubed form of the mixed compound is further processed in an extrusion machine. Various size cross-linked polyethylene pipes are made, with a typical size being 1.00" I.D. All drag is eliminated at the die.

Other heavy duty extrudates such as pipe and conduit can similarly be benefited when the anti-drag TFE lubricant is employed in the critical, low amounts when the basic material is another plastic, such as polyvinylchloride or acrylonitrile-butadiene-styrene ethylene-vinyl acetate co-polymers and the like. Other hollow products made by the process taught by Kohlwey in U.S. Pat. No. 3,048,567, are similarly benefited.

We have found that reclaimed polytetrafluorethylene is actually a preferred form of lubricant provided that it is reduced to the critical average particle size of at least 0.5 micron, and preferably in the range of 1 to 8 microns. This is surprising because Haroldson's U.S. Pat. No. 2,939,178 shows that the normal condition of such a product is hard and leathery. He shows that this texture can only be overcome by applying very high pressures under complete confinement to compositions which are essentially 100% reclaimed Teflon. It is clear that a hard, leathery texture woud be expected to interfere with rather than provide lubrication. Therefore, the effectiveness of the tiny, critical additions of our lubricant is surprising.

We claim:

1. A lubricating method for reducing die-plating and die-drag during the extrusion of viscous rubber and elastomeric plastic compositions in the form of a green stock through a forming and extruding die consisting essentially of adding to said green stock an amount of from 0.05 to 0.45 part of finely divided polytetrafluorethylene per 100 parts of rubber or elastromeric plastic prior to extruding said green stock through the forming and extruding die, said finely divided polytetrafluorethylene having an average particle size of from about 0.5 up to 8.0 microns, the amount of said polytetrafluorethylene added being less than that which will alter the chemical, physical and electrical properties of the green stock after vulcanization and said polytetrafluorethylene being intimately mixed with a minor amount of an inert binder selected from the group consisting of solid polyisobutylene rubber and solid ethylene-propylene copolymer rubber.

2. A method as claimed in claim 1 wherein said polytetrafluorethylene has a particles size of at least 1 micron and is in the form of reclaimed polytetrafluorethylene.

3. A method as claimed in claim 1, wherein the rubber or elastomeric plastic is selected from the group consisting of butyl rubber, cross-linked polyethylene, natural rubber, butadiene-acrylonitrile rubber, chlorosulfonated polyethylene rubber, neoprene, ethylene propylene rubbers, styrene-butadiene, polyisoprene, epichlorhydrin rubbers, flexibilized polyvinyl chloride, and ethylene vinyl acetate copolymers.

4. A method as claimed in claim 1, wherein said binder is present in an amount of less than about 20%, the remainder being said tetrafluorethylene, and said binder is added in the form of a preweighed strip in 2 ounce weight units for addition to each 100 parts of rubber or plastic.

5. A method as claimed in claim 3, wherein said green stock contains butyl rubber which is used for making cable insulation.

6. A method as claimed in claim 3 wherein said green stock contains styrene-butadiene rubber which is used for making tire tread and tire sidewall stock.

7. A method as claimed in claim 3, wherein said green stock contains ethylene-propylene rubber which is used for making wire and cable insulation.

8. A method as claimed in claim 3, wherein said green stock contains polybutadiene rubber which is used for making tire tread stock.

9. A method as claimed in claim 3, wherein said green stock contains cross-linked polyethylene which is used for making heavy duty pipe or insulated wire.

10. A method as claimed in claim 3, wherein said green stock contains ethylene-propylene-diene rubber which is used for making wire and cable insulation.

11. A method as claimed in claim 3, wherein said green stock contains butadiene-acrylonitrile rubber which is used for making gasoline-resistant hose.

12. A method as claimed in claim 3, wherein said green stock contains natural rubber which is used for garden hose.

13. A method as claimed in claim 3, wherein said green stock contains acrylic rubber which is used in making gaskets.

14. A solid composition for lubricating green stock in advance of the forming and extruding die, which reduces die-plating and die-drag during extrusion of viscous rubber and elastomeric plastic compositions which constitute said green stock, consisting essentially of a major proportion of finely divided polytetrafluorethylene powder having an average particle size of at least 0.5 micron up to 8.0 microns, effective in an amount of 0.05 to 0.45 part per 100 parts of rubber in the green stock, and from 15 to 30% of a solid binder having a Shore A Hardness value between 25 and 45, a Mooney viscosity value between 35 and 60 and being selected from the group consisting of polyisobutylene rubber and ethylene-propylene copolymer rubber.

15. A solid composition as claimed in claim 14, wherein said solid composition is pressed into slab form in 2 ounce weight sub-units totalling up to 8 ounces.

References Cited

UNITED STATES PATENTS

| | | | |
|---|---|---|---|
| 2,644,802 | 7/1953 | Lomtz | 252—12 |
| 2,945,773 | 7/1960 | Panagrossi et al. | 252—12 |
| 2,998,397 | 8/1961 | Riesing | 252—12 |
| 3,011,221 | 12/1961 | Howell | 252—12 |
| 3,218,255 | 11/1965 | Pratt | 252—12 |
| 3,271,308 | 9/1966 | Viet et al. | 252—12.2 |
| 3,287,288 | 11/1966 | Reiling | 252—12 |
| 3,344,064 | 9/1967 | Brady et al. | 252—12 |
| 2,368,522 | 1/1945 | Cornell et al. | 52—12 |
| 2,365,375 | 12/1944 | Bailey et al. | 264—211 |
| 2,624,914 | 1/1953 | Rhodes | 264—177 |
| 3,265,778 | 8/1966 | Griffith | 264—211 |

DANIEL E. WYMAN, Primary Examiner

I. VAUGHN, Assistant Examiner

U.S. Cl. X.R.

252—58, 59; 264—177, 211, 235, 236